United States Patent [19]

Crawshay et al.

[11] 4,184,581

[45] Jan. 22, 1980

[54] LOADING APPARATUS FOR MINES

[75] Inventors: Richard Crawshay, North Vancouver; Malcolm D. Rowswell, Mississauga, both of Canada

[73] Assignees: Canadian Mine Services Limited, Vancouver; Kerr Addison Mines Ltd., Toronto, both of Canada

[21] Appl. No.: 783,712

[22] Filed: Apr. 1, 1977

[51] Int. Cl.$^2$ .............................................. B65G 65/04
[52] U.S. Cl. ...................... 198/308; 198/301; 198/318; 198/507; 198/517
[58] Field of Search ............... 198/301, 308, 311, 315, 198/316, 318, 507, 517, 520, 522, 746-748, 540, 547, 562, 557, 616; 214/83.14, 0.3, 90 R, 89; 37/108 R, 4, DIG. 1; 299/43, 64; 172/7, 9, 11, 33; 105/153; 414/565, 567

[56] References Cited

U.S. PATENT DOCUMENTS

| 471,268 | 3/1892 | Edison | 198/540 |
|---|---|---|---|
| 1,307,009 | 6/1919 | Joy | 214/89 |
| 1,701,013 | 2/1929 | Ronk | 105/153 |
| 3,095,080 | 6/1963 | Wagner | 198/308 |
| 3,540,569 | 11/1970 | Stone | 198/616 |
| 3,547,287 | 12/1970 | Cunningham | 198/311 |
| 3,574,327 | 4/1971 | Golfi | 198/308 |
| 3,750,762 | 8/1973 | Eaton | 37/DIG. 1 |
| 4,011,936 | 3/1977 | Hall | 198/517 |

FOREIGN PATENT DOCUMENTS

| 323459 | 11/1913 | Fed. Rep. of Germany | 198/517 |
|---|---|---|---|
| 496628 | 4/1930 | Fed. Rep. of Germany | 198/517 |
| 1234550 | 10/1960 | France | 198/517 |

*Primary Examiner*—Joseph E. Valenza
*Attorney, Agent, or Firm*—Carver and Company

[57] ABSTRACT

Loading apparatus having vehicle body, inclined conveyor assembly extending upwardly and rearwardly from front of vehicle body, and hopper adjacent front of vehicle to direct material onto conveyor. Apparatus has extendable excavating assembly including a guide mounting a carrier which carries a hoeing assembly. The guide is mounted on vehicle body, and the carrier means cooperates with the guide for movement parallel to movement of conveyor when viewed from above. The hoeing assembly is carried on carrier means to be generally adjacent the hopper to draw material onto hopper for feeding onto conveyor. Carrier and guide can be carriage mounted on rails, or telescoping ram arrangement to provide extendable mount for hoeing assembly which increases reach thereof without requiring excessively long arms, and also facilitates operation of hoeing assembly for drawing material onto the hopper. Operator is positioned at front of vehicle for good visibility during operation of hoeing assembly. Conveyor assembly is supported on releasable hinge means at front end, and on elevating cylinders adjacent rear end and can be easily removed to service conveyor belt.

32 Claims, 14 Drawing Figures

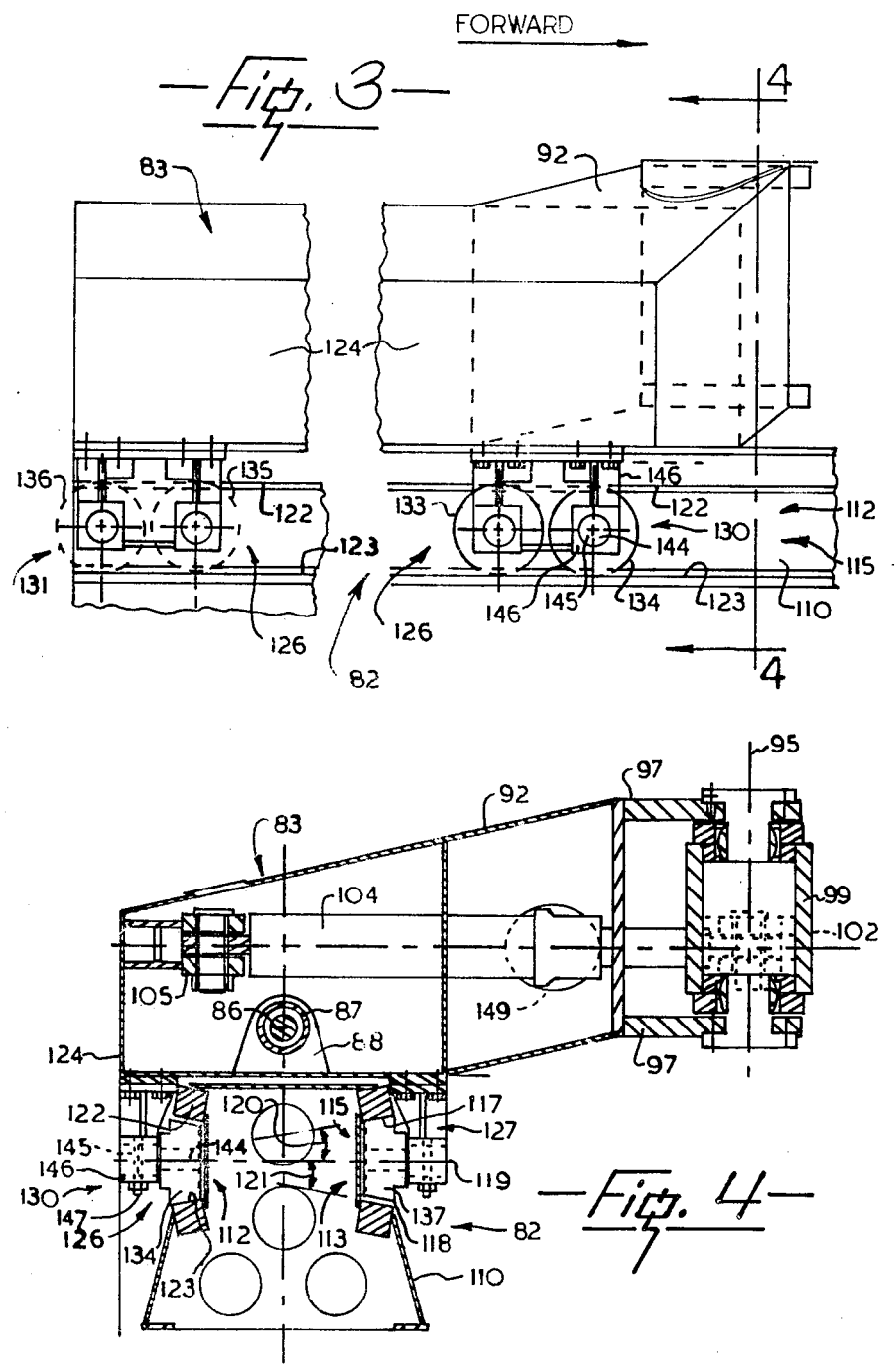

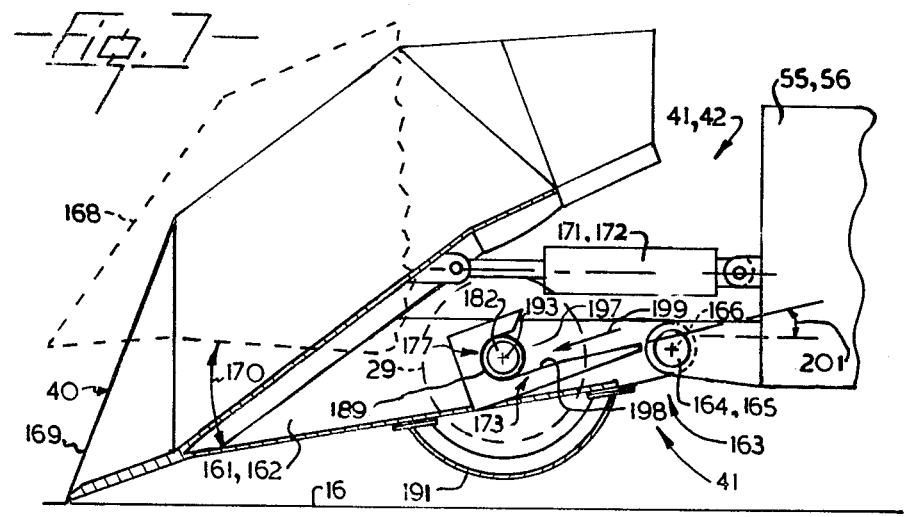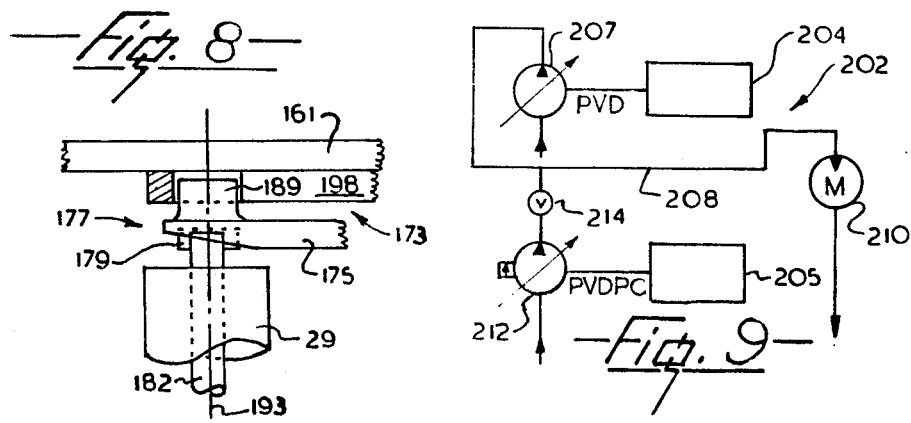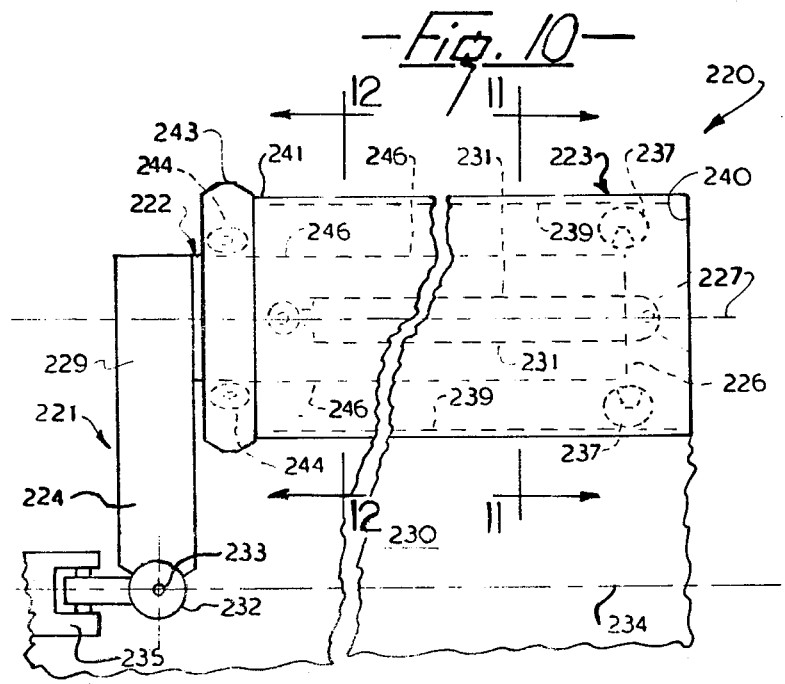

U.S. Patent  Jan. 22, 1980  Sheet 6 of 6  4,184,581
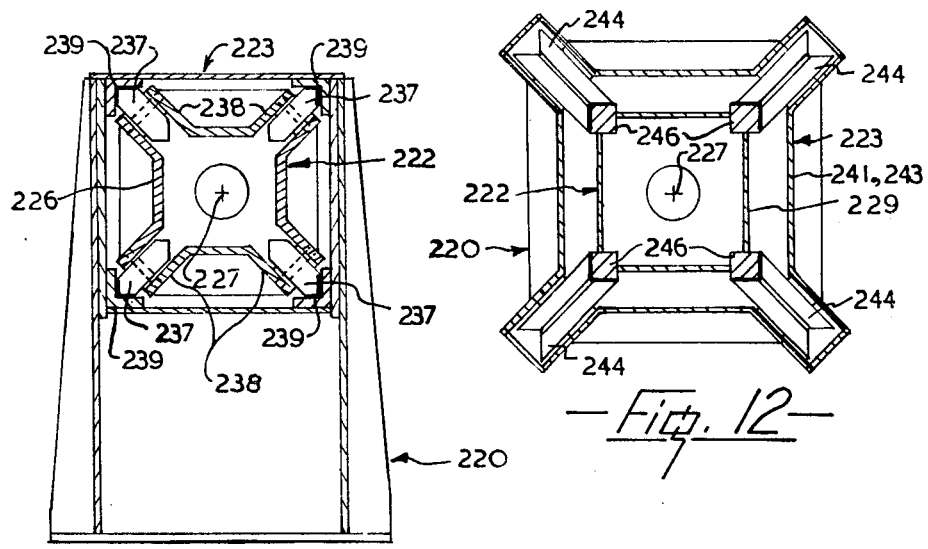
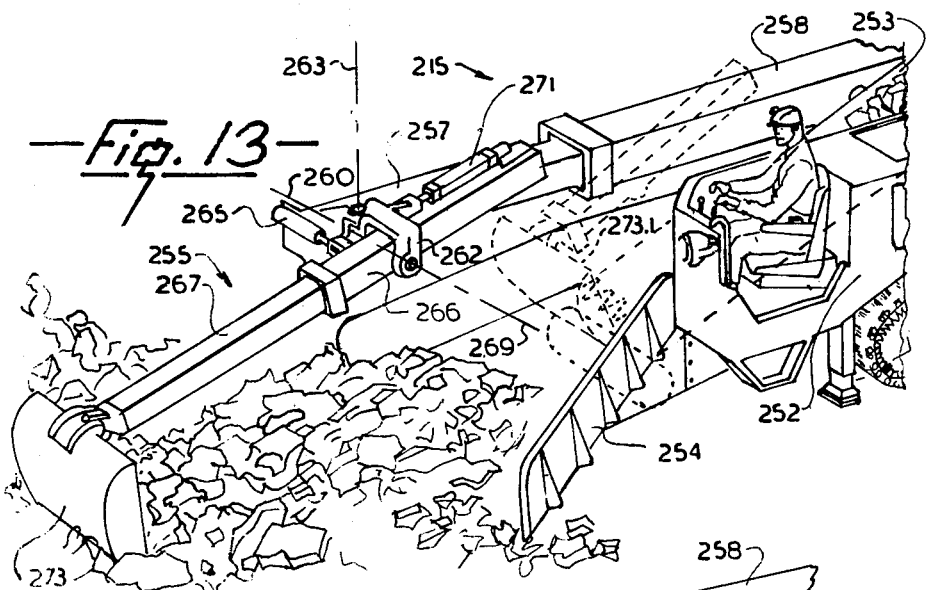

LOADING APPARATUS FOR MINES

BACKGROUND OF THE INVENTION

1. Field of the Invention

The invention relates to a loading apparatus particularly adapted for loading ore or "muck" into an ore carrier as used in mines, particularly in underground mines.

2. Prior Art

Many types of ore loading devices are known, some of which use a bucket hinged on a pair of articulated arms, such as in a back hoe, to feed a hopper of an upwardly inclined conveyor which dumps the muck from an upper end thereof into an ore carrier. Such devices are limited in that operation of the articulated arms requires considerable skill on the part of an operator because the back hoe is commonly positioned non-symmetrically relative to the conveyor and for an unskilled operator horizontal drawing of the bucket towards the conveyor is difficult with two hinged arms.

When the back hoe is being retracted and the bucket is approaching the conveyor, a main connector between the arms is extended upwardly. This presents problems in underground mines because, for a back hoe with a reasonable reach, the articulated arms are relatively long which require adequate headroom in the drift or tunnel in which the apparatus is operating. Thus, when an apparatus with a reasonable reach is used, additional headroom in the drift must be provided which requires more headroom excavation than is the usual practice. Also crowding of the arms, ie interference between the arms when retracted, causes problems when designing for optimum back hoe stroke. Futhermore to reduce the work of the back hoe, such loading apparatus require moving at irregular intervals to bring the conveyor as close as is practical to the muck pile, which requires the operator to stop mucking, advance the conveyor, and then to recommence mucking. This is time consuming and can result in considerable loss in productivity, and the irregular movement of the apparatus can result in excessive wear of the power train thereof.

The conveyors of such loading apparatus have belts which are subject to damage and heavy wear which necessitates complete replacement of the belt, or repairing or splicing of the belt "in situ" ie without removal from the apparatus. When a belt is repaired "in situ" usually a mechanical hinge joint is used which commonly results in a relatively unsatisfactory belt repair of short life. Also, whilst being repaired the apparatus is inoperative for several hours and obstructs the work area preventing other loading apparatus from working there. If the apparatus is removed from the work area so that a new conveyor belt can be fitted or so that the belt can be repaired by a permanent vulcanized join, this also results in considerable downtime of that particular apparatus but sometimes a replacement apparatus can operate in the same area. Both methods as used presently are relatively unsatisfactory because of the difficulty of replacement of the conveyor belt itself. Thus a conveyor assembly that could easily be serviced as a unit itself without making "in situ" repairs of the belt or requiring removal of the machine from the area would be of advantage.

SUMMARY OF THE INVENTION

The invention reduces the difficulties and disadvantages of the prior art by providing a loading apparatus in which a back hoe assembly is fitted symmetrically relative to an inclined conveyor, thus permitting easier operation by an operator who is positioned adjacent a lower end of the conveyor. The back hoe assembly is mounted on an extendable mount which increases reach of the back hoe without a corresponding increase in length of articulated arms of the back hoe. The extendable mount is arranged to permit straight drawings of the bucket towards the conveyor, thus reducing demands on operator's skill as well as permitting the apparatus to operate in a drift having a lower headroom than would be required for a conventional back hoe having a similar reach. Furthermore, the apparatus has a conveyor assembly in which the conveyor belt and support rollers thereof are supported in a frame assembly which is easily removable for conveyor assembly replacement without causing excessive downtime of the equipment.

A loading apparatus according to the invention includes a ground supported vehicle body adapted for positioning where desired, an inclined conveyor assembly extending upwardly and rearwardly along a centrally disposed longitudinal feed axis thereof from a front of the vehicle, and a hopper assembly adjacent the front of the vehicle adapted to direct material onto the conveyor. The apparatus is characterized by an excavating assembly including a guide means, a carrier means and a hoeing assembly. The guide means is mounted on the vehicle body and has a guide axis disposed generally parallel to and displaced laterally from the feed axis of the conveyor when viewed from above. The carrier means is supported by the guide means and has means to move the carrier means along the guide axis on one side of the conveyor assembly. The hoeing assembly cooperates with the carrier means so as to be generally adjacent the hopper and has a bucket. The hoeing assembly has first and second arms having respective inner and outer ends and cooperating with each other to permit extension thereof relative to the carrier means. The arms are connected and have means to move the first and second arms and are connected to the carrier means at a location within a vertical plane containing the feed axis. The first arm cooperates with the carrier means at a location disposed symmetrically of the conveyor, and the outer end of the second arm is connected to the bucket which is adapted to draw material onto the hopper for feeding onto the conveyor. The hoeing assembly is thus carried on an extendable mount which increases reach thereof without requiring increased headroom.

A detailed disclosure following, related to drawings, describes a preferred embodiment of the invention which however is capable of expression in structure other than that particularly described and illustrated.

DESCRIPTION OF THE DRAWINGS

FIG. 3 is a simplified fragmented side elevation of a portion of the apparatus showing carriage and rail means, FIG. 4 is a simplified section on line 4—4 of FIG. 3, FIG. 7 is a simplified fragmented diagrammatic side elevation of a portion of the hopper assembly showing support and swinging means thereof, some structure being superimposed on other structure, FIG. 8 is a simplified detailed fragmented top plan of a lower portion of the conveyor, FIG. 9 is a simplified hydraulic schematic showing some portions of the invention, FIG. 10 is a simplified fragmented top plan of a first alternative excavating assembly, FIG. 11 is a simplified fragmented section on line 11—11 of FIG. 10, FIG. 12 is a simplified fragmented section on line 12—12 of FIG. 10, FIG. 13 is a simplified fragmented perspective of a second alternative excavating assembly, FIG. 14 is similar to FIG. 13 showing swing of the excavating assembly.

DETAILED DISCLOSURE

Figure 1:
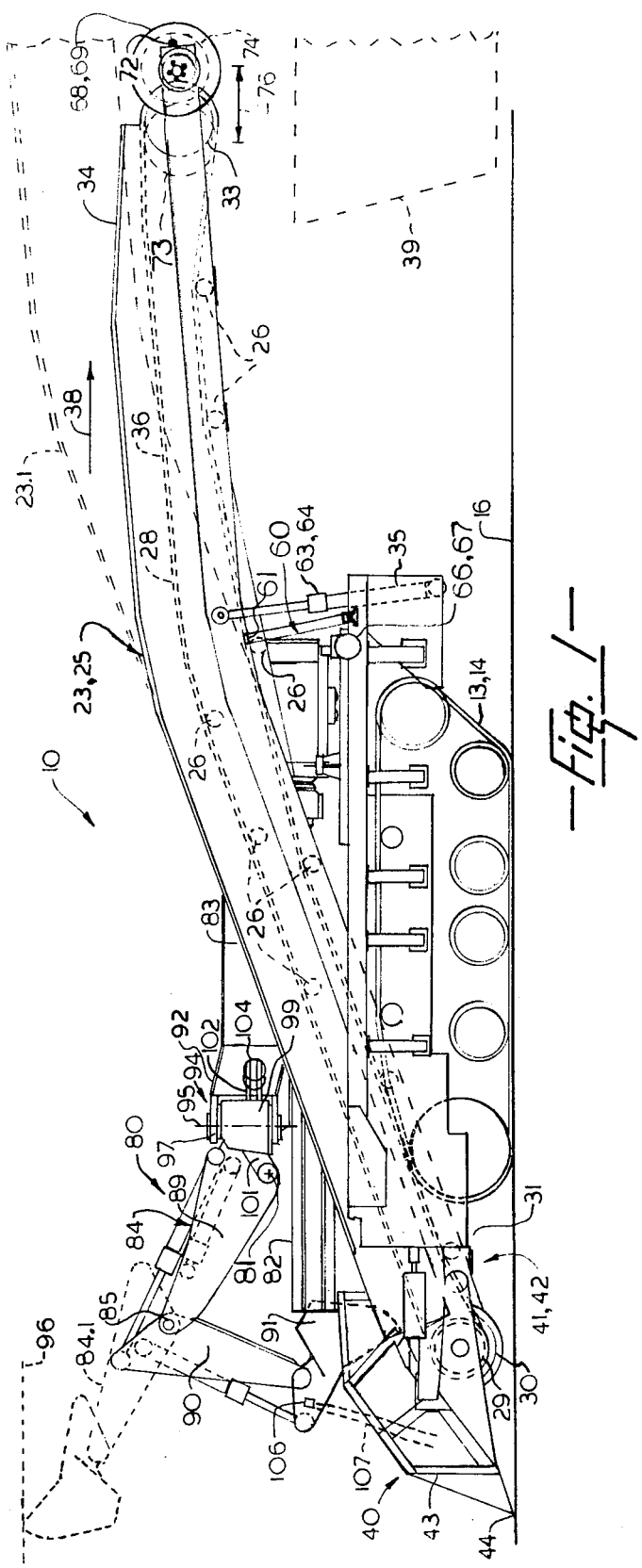
FIG. 1 is a simplified fragmented side elevation of the apparatus in which portions of the apparatus have been omitted, and a back hoe thereof is shown in two positions.
Figure 2:
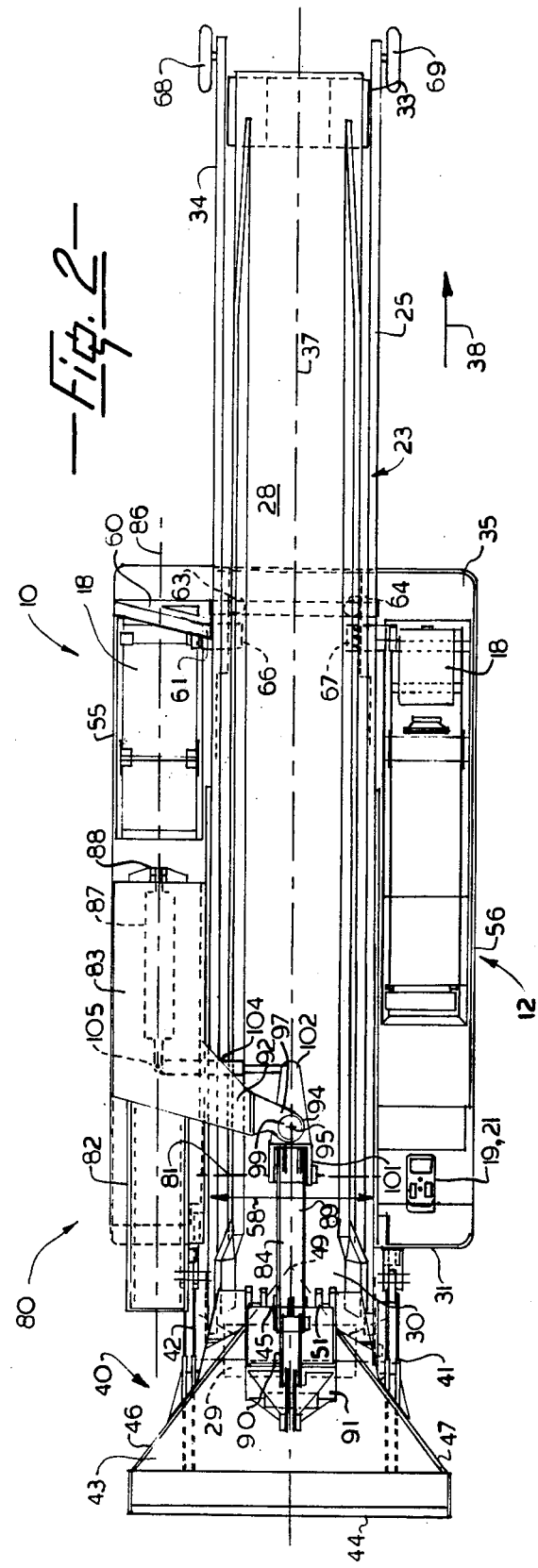
FIG. 2 is a simplified top plan of the apparatus of FIG. 1.

FIGS. 1 and 2

A loading apparatus 10 according to the invention has a vehicle body 12 having a pair of spaced crawler tracks 13 and 14 serving as ground bearing means to support the vehicle body on the ground 16. The apparatus includes power and control means 18 and 19 respectively for positioning the vehicle where desired, the power means being preferably a combination of electrical and diesel-driven hydrostatic hydraulic drive for reasons to be described with reference to FIG. 9. The control means is situated in an operator cab 21. The apparatus has an inclined conveyor assembly 23 which includes a conveyor frame 25 carrying a plurality of conveyor idler rolls 26 extending thereacross to serve as support means to support a cleated conveyor belt 28 thereon. The conveyor assembly has a free wheeling tail drum 29 at a lower portion 30 thereof adjacent a front 31 of the vehicle and a powered head drum 33 at an upper portion 34 thereof, the upper portion being adjacent and extending beyond a rear 35 of the vehicle. The conveyor has a centrally disposed longitudinal feed axis 37 such that an upper run 36 of the conveyor moves in direction of an arrow 38 to carry material from the lower portion 30 thereof to the upper portion 34 so as to discharge the material from the upper end into a waiting receptacle, such as an ore carrier 39, shown simplified in broken outline. The conveyor is preferably a chevron cleated flexible rubber fabric belt, however a chain-type conveyor with metal flights can be substituted and in the claims the term "conveyor means" refers to either type.

The apparatus has a hopper means 40 having an upwardly and rearwardly inclined hopper body 43 adjacent the lower portion 30, and hopper swinging means 41 and 42 cooperating with the hopper body and the vehicle body to permit the hopper body to be raised and lowered as will be described with reference to FIGS. 5 and 6. The hopper has a forward lip 44 positioned adjacent the ground 16, and a rear lip 45 extending over the lower portion 30 of the conveyor so as to cooperate therewith to direct material onto the conveyor. The hopper body has two side walls 46 and 47 extending between the front and rear lips, the side walls being inclined rearwardly and inwardly symmetrically relative to the longitudinal axis 37 of the conveyor. Thus, when axes of the side walls are projected rearwardly as broken lines they converge rearwardly at a theoretical vertex 49, the vertex being within a vertical plane containing the longitudinal axis 37 of the conveyor. Thus the hopper is disposed symmetrically relative to the conveyor. As will be described with reference to FIGS. 5 and 6, a grizzly 51 extends between the sidewalls and rearwardly from the rear lip 45 so as to permit fine material from the hopper to pass therethrough to coat the conveyor with fines prior to impingement by heavier material that was too coarse to pass the grizzly.

The vehicle body 12 includes a pair of spaced crawler track frames 55 and 56 spaced apart so as to define a clearance 58 therebetween, the clearance being sufficient to accept the lower portion 30 of the conveyor adjacent the ground. The vehicle body thus has a clearance which extends from the front of the vehicle rearwardly and the lower portion of the conveyor is fitted within the clearance and is supported adjacent the lower portion thereof on trunnion means, not shown, cooperating with the vehicle body as will be described with reference to FIGS. 5 through 8. The conveyor is supported adjacent the upper portion 34 on a pair of parallel elevating cylinders 63 and 64 extending between the vehicle body and the conveyor assembly adjacent the upper portion thereof. The elevating cylinders serve as an adjustable means extending between the vehicle body and the conveyor assembly to vary height of the conveyor, for example to reduce height of the upper end of the conveyor when travelling and to provide clearance for trucks when loading. The adjustable means also permits the operator to vary the angle of inclination of the conveyor and such variation may be necessary to reduce excessive conveyor inclination in instances where the ground 16 is sloping. Thus the conveyor is supported adjacent the lower portion thereof at the front of the vehicle and by the adjustable means at the rear of the vehicle. A hinged conveyor steady means 60 cooperate with the conveyor assembly and has a releasably slidable connection 61 at an upper end thereof which permits vertical and longitudinal movement of the conveyor frame and concurrently restricts lateral movement thereof. A pair of axially aligned, spaced support rollers 66 and 67 are carried on the frames 55 and 56 beneath the conveyor frames and a pair of spaced wheels 68 and 69 straddle the upper portion 34 of the conveyor, to protect and support the assembly as will be described.

The conveyor assembly has a width at the lower portion 30 no greater than the clearance 58 and after releasing control and power lines, not shown, and connections at the adjustable means, the steady means and the lower portion of the conveyor, the conveyor assembly can be removed as a complete assembly from the vehicle body by withdrawing the conveyor assembly rearwardly. For removal, the conveyor assembly is moved longitudinally rearwardly by pulling on a cable, not shown, attached to the upper portion 34 whilst the middle and lower portions of the assembly are supported on the support rollers 66 and 67, broken outline, and the upper portion is supported on the wheels 68 and 69 on the ground. A portion of the conveyor assembly in the partially removed position is shown in FIG. 1 in broken outline and is designated 23.1. The few releasable connections and existing supports permit easy replacement of the complete conveyor assembly by allowing the conveyor assembly to be removed as a unit for servicing, for instance to replace a worn or damaged conveyor belt. Clearly it permits relatively fast replacement with a substitute conveyor assembly, thus eliminating the need to remove the apparatus from the work area, or to perform "in situ" splices of conveyor belts. The head drum 33 has a take-up means 72 to move the drum between extreme forward and rear positions 73 and 74, shown in broken outline, so as to accommodate changes in length of the conveyor belt over a range 76.

An excavating assembly 80 according to the invention includes a rail means 82, a carriage means 83 and a hoeing assembly 84. The rail means has a guide axis 86 disposed generally parallel to the feed axis of the conveyor and displaced laterally of the conveyor assembly when viewed from above as in FIG. 2. The carriage means is mounted on the rail means for movement along the rail means, that is for movement along the guide axis 86 on one side of the conveyor assembly. A traversing cylinder 87 cooperates with the carriage means 83 to serve as power means for moving the carriage means along the rail means. The cylinder 87 has a rear end connected to an anchor 88 on the body 12 and a forward end connected to the carriage so that extension and retraction of the cylinder reciprocates the carriage along the guide means, the cylinder being arranged so that a piston rod thereof is protected by the carriage.

The hoeing assembly 84 has first and second arms 89 and 90 having respective undesignated inner and outer ends. The inner ends are hinged together at a main connector 85 to permit relative swinging therebetween as in a conventional back hoe assembly and a bucket 91 is journalled at an outer end of the second arm. The arms and the bucket cooperate with undesignated hydraulic cylinders and function similarly to a conventional back hoe, which term is used herein to refer to a hoeing assembly having two articulated arms and a bucket as described.

A hoeing assembly support 92 extends inwardly from the carriage means 83 and has a journalling means 94 mounted thereon having a generally vertical axis of rotation 95 disposed within a plane containing the feed axis 37 of the conveyor. Thus the journalling means is disposed symmetrically of the conveyor and includes a bearing means 97 mounted adjacent an outer portion of the back hoe support 92 having a rotatable means 99 journalled in the bearing means for rotation about the axis 95. The means 99 has first and second mounts 101 and 102 extending therefrom, the first mount journalling the inner end of the first arm of the hoeing assembly 84 for rotation about a horizontal axis of rotation 81. A hydraulic swing cylinder 104 extends between a connector 105 cooperating with a portion of the carriage means 83 and the second mount 102 of the rotatable means, so that actuation of the cylinder 104 rotates the rotatable means about the axis 95 to swing the back hoe assembly as desired. Thus the first arm of the back hoe assembly is journalled for rotation about both horizontal and vertical axes of rotation.

The hoeing assembly is shown in broken outline in an upright extended position at 84.1 indicating maximum upwards reach of the bucket for scraping a drift roof, shown as broken outline 96, which of course must be higher than an uppermost portion of the conveyor assembly or vehicle. In FIGS. 1 and 2, the carriage means 83 is positioned at an extreme aft position on the rail means 82, and the carriage has an extreme forward position, shown in FIG. 6 only, from which, as the back hoe assembly is retracted from the forward position, the bucket 91 sweeps material initially downwards then rearwards and minimally upwards onto the hopper, thence onto the conveyor belt. By mounting the back hoe on a traversable carriage means, a greater forward reach of the back hoe assembly is attained with arms of normal length then would be possible with a fixed prior art back hoe having arms of the same lengths. Thus the first arm of the hoeing assembly 84 cooperates with the means 94 and thus with the carriage means and rail means, so that the bucket is adapted to draw material from a considerable distance forward of the apparatus and to be positioned generally adjacent the hopper for feeding the material onto the conveyor without requiring excessively long arms for increasing forward reach of the back hoe.

The guide axis 86 of the excavating assembly 80 is disposed generally parallel to the feed axis 37 of the conveyor when viewed from above, and generally parallel to a plane, namely the ground 16, containing lower surfaces of the ground bearing means when viewed laterally as in FIG. 1. Thus, if the carriage means 83 were traversed to the forward position with the articulated arms of the hoeing assembly extended, and the bucket is then lowered to dig into the muck, subsequent rearward movement of the carriage only, without further articulation of the arms of the back hoe, cause a lower edge of the bucket to follow a line parallel to the ground 16 to draw muck towards the hopper. This action by itself is not usually used in mucking but it is seen that the carriage and rail means provides an extendable back hoe mount having an axis of extension and retraction parallel to the ground which permits drawing the bucket automatically parallel to the ground when the back hoe assembly is locked in a position engaging muck and the extendable mount is retracted. When mucking the operator can use a traversing action of the carriage simultaneously with articulation of the back hoe to draw the bucket generally parallel to the ground, with the option of keeping the carriage means stationary if required. With practice, an operator can draw material onto the hopper using both movements above and there is clearly a greater choice of movement and reach than if the back hoe assembly were fixed to the body and only the arms are articulated. This is a distinct advantage in an underground enviroment.

As previously stated, the extendable action of the excavating assembly increases reach of the back hoe without requiring articulated arms of excessive length. When the back hoe is retracted, the main connector 85 of the arm rises upward and sufficient headroom is required for this. For a back hoe mounted on a nonextendable mount and having reach similar to that of the present invention, longer arms would be required which would require additional headroom. Thus two distinct advantages accrue from use of an extendable back hoe mount.

The hoeing assembly mount is always positioned centrally relative to the conveyor assembly and when the back hoe is correctly positioned longitudinally relative to the hopper, articulation of the back hoe causes the bucket to draw material up the hopper with a sweeping motion primarily in the vertical plane. Lateral movement of the bucket can be accommodated by providing suitable cross-over valving, not shown, in the controls of the swing cylinder 104 which permits the bucket to "follow" the hopper sidewalls as it is drawn up the hopper, thus reducing interference therebetween.

As best seen in FIG. 2, the operator control cab 21 is positioned adjacent the front 31 of the vehicle body and to one side of the conveyor opposite to the hoeing assembly. Thus the operator can see most of the hopper and bucket from his relatively close position which is an improvement over some prior art devices and permits good visibility for the operator whilst operating the apparatus. A water spray nozzle 106 fitted to the bucket 91 directs a water jet 107 onto the muck heap for dust control, further improving visibility and reducing health hazards.

FIGS. 3 and 4

The rail means 82 includes a central member 110 and right hand and left hand track means 112 and 113 disposed on each side of the central member. The track means 113 includes a track face pair 115 having upper and lower track faces 117 and 118 disposed generally oppositely to each other. The track face 117 is inclined outwardly and upwardly at an angle 120 to the horizontal, and the face 118 is inclined outwardly and downwardly at an angle 121 so as to provide a pair of outwardly diverging track faces disposed symmetrically about a horizontal plane 119 passing between the track faces. The right hand track means 112 has a similarly inclined pair of upper and lower track faces 122 and 123 and which are similarly inclined and disposed symmetrically about the horizontal plane. The lower tracks are inclined at the angles as shown so as to promote shedding of foreign matter that might otherwise collect on the lower track faces.

The carriage means 83 includes a carriage body 124 and right hand and left hand wheel groups 126 and 127 engaging the right hand and left hand track means 112 and 113 respectively. The wheels straddle the track means so as to restrain the carriage against rotational forces arising from the back hoe. The right hand wheel group 126 includes forward and rear wheel pairs 130 and 131 respectively. The forward wheel pair 130 has upper and lower wheels 133 and 134 respectively which contact the upper and lower track faces 122 and 123 respectively as best seen in FIG. 3. Similarly the rear wheel pair 131 has upper and lower wheels 135 and 136 which contact the track faces 122 and 123 respectively. The left hand wheel group has two similar wheel pairs, and as seen only in FIG. 4, an upper wheel 137 thereof contacts the upper face 117 of the left hand track means within a transverse vertical plane containing the lower wheel 134 on the right hand side. Thus each wheel group on each side of the carriage includes forward and rear wheel pairs, which each wheel pair having upper and lower wheels which contact the upper and lower track faces respectively, the wheels having truncated conical peripheries so as to be complementary to the angles of the respective track faces.

Referring mainly to FIG. 4, the wheel 134 is journalled on a spindle 144 extending from an eccentric shaft 145 both shown in broken outline, the shaft being releasably clamped in a housing 146 extending downwardly from the carriage means. Lock means 147 in the housing are provided to permit selective rotation of the eccentric shaft within the housing so as to permit vertical adjustment of the wheel 134 relative to the carriage to ensure snug contact on the track face 124. All of the wheels have similar eccentric adjustment means which permit accurate spacing of the wheels to eliminate essentially lost motion between the track means and the carriage. Other adjustment means can be provided to attain the same results.

As best seen in FIG. 4, the swing cylinder 104 extending between the connector 105 in the carriage and the second mount 102 on the journalling means 94 passes through a clearance opening 149 in the back hoe support 92. It is seen that the traversing cylinder 87 is enclosed within the carriage means 83 and is positioned concentrically with the guide axis 86.

FIGS. 5 through 8

The hopper means 40 has a pair of spaced support arms 161 and 162 extending rearwardly from and on each side of the hopper. The arms are spaced apart so as to straddle the lower portion 30 of the conveyor and have a hopper hinge means 163 to hinge the arms on the forward end of the vehicle body. The hinge means has hinge journals 164 and 165 respectively on the arms and on the crawler track frames 55 and 56 which permit the hopper to swing about a hopper hinge axis 166 disposed generally normally to the feed axis 37 of the conveyor. As seen in FIG. 7, the hopper can swing between a fully raised position 168, shown in broken outline, used mainly when the apparatus is driven any distance, and a fully lowered position 169, shown in full outline, which swinging permits the hopper to accommodate ground undulations. The range of swing is through an angle 170, which for the particular hopper shown, causes the forward lip thereof to sweep through an arc of about 0.7 meters. First and second hopper cylinders 171 and 172 have forward ends cooperating with the hopper and rear ends cooperating with the frames 55 and 56 so that actuation of the cylinders swings the hopper between the raised and lowered positions. The arms 161 and 162, the hinge journals 164 and 165 and the hopper cylinders 171 and 172 serve as the hopper swinging means 41 and 42 which cooperate with the hopper and vehicle body to swing the hopper as needed. Hopper moving means other than the hopper cylinders can be substituted to swing the hopper in a similar manner. The arms 161 and 162 have aligned trunnion seats 173 and 174 on opposed inner sides thereof which are spaced apart to straddle the lower portion of the conveyor to serve as first hinge portions of a conveyor hinge means 177 as will be described.

The conveyor frame 25 has spaced apart side frames 175 and 176, and tail drum bearings 179 and 180 which journal a spindle 182 of the tail drum 29 to permit rotation of the tail drum relative to the frame as the conveyor belt 28 is driven. As previously stated, the idler roller 26 extend between the frames to support upper and lower runs of the conveyor belt running thereon. The upper run of the conveyor belt is also troughed by troughing rolls 185, shown in broken outline, so that edges of the conveyor belt assume raised positions downstream of the grizzly 51 as is conventional practice, one raised edge 186 only being shown in FIG. 6. The conveyor assembly has similar aligned trunnions 189 and 190 extending outwardly from lower portion of the side frames 175 and 176 of the frame 25, the trunnions serving as second hinge portions of the conveyor hinge means 177 and engaging the trunnion seats 173 and 174 respectively of the support arms 161 and 162. The trunnion seats and complementary trunnions form the conveyor hinge means 177 having a conveyor hinge axis 193 disposed generally normally to the feed axis of the conveyor to permit the conveyor assembly to rotate relative to the hopper. As best seen in FIGS. 5 and 8, ends of the spindle 182 of the head drum are journalled in the respective bearings recessed and aligned with the respective trunnions and thus the tail drum 29 of the conveyor assembly rotates about an axis coincident with a conveyor hinge axis 193.

Thus first and second hinge portions of the hopper and the conveyor frame cooperate with each other to hinge the conveyor frame to the hopper so that the conveyor frame can follow, to a degree, movement of the hopper. This is of advantage because, when the hopper swings to accommodate variations in level of the ground 16, the conveyor also moves so that, as seen in FIG. 6, the grizzly 51 is maintained at a spacing 195 above the belt 28 which should be within limits such that the minimum spacing provides clearance for the belt and the maximum spacing ensures that material fed onto the belt does not fall an excessive distance onto the belt, thus reducing risk of damage to the belt when the hopper is at the maximum spacing.

Figure 5:
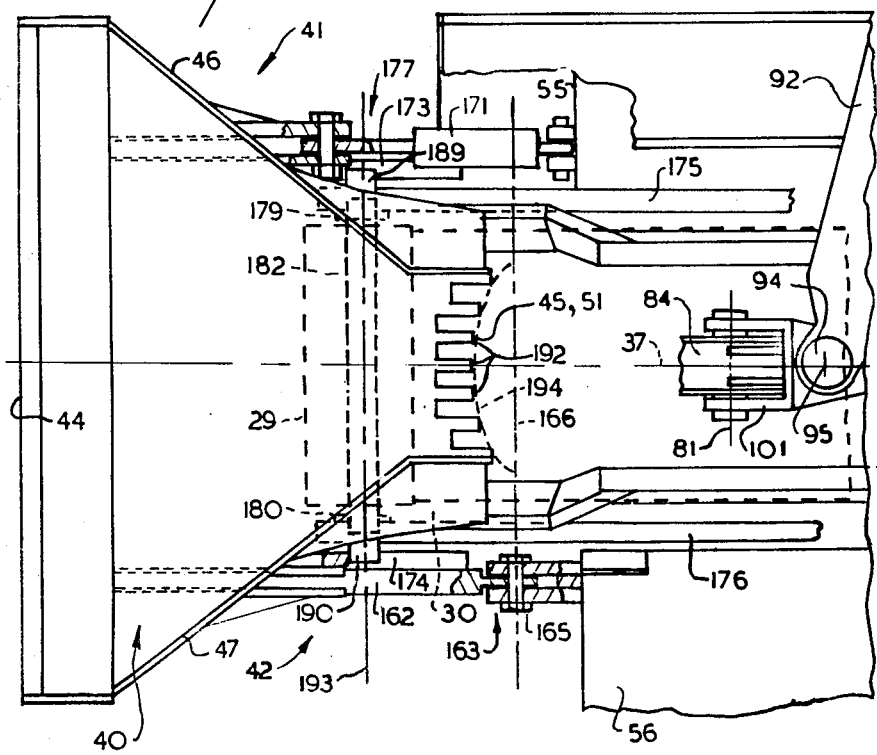
FIG. 5 is a simplified fragmented top plan view of a hopper assembly and lower portions of a conveyor, some portions being omitted.

As seen in FIG. 5 the grizzly 51 has a plurality of laterally spaced fingers severally 192 extending rearwardly therefrom, the fingers having outer ends disposed within an arc 194, shown as broken outline, which has a centre disposed rearwardly of the grizzly and coplanar with the axis of the conveyor. Spaces between fingers adjacent the centre of the grizzly extend more forwardly than spaces between outer fingers. It can be seen that as muck is drawn rearwardly along the grizzly, initially fine material falls onto the conveyor belt through a centre portion of the grizzly, and subsequently through outer portions of the grizzly. The fines thus collect in the trough of the conveyor belt, then on the inclined sides of the belt. The grizzly thus distributes fines onto the belt, first at the centre then adjacent the edges thereof, prior to heavier material falling onto the belt from ends of the fingers. This protects the belt from excessive wear, and reduces to some extent shock loading of heavier material that cannot pass between the fingers.

Figure 6:
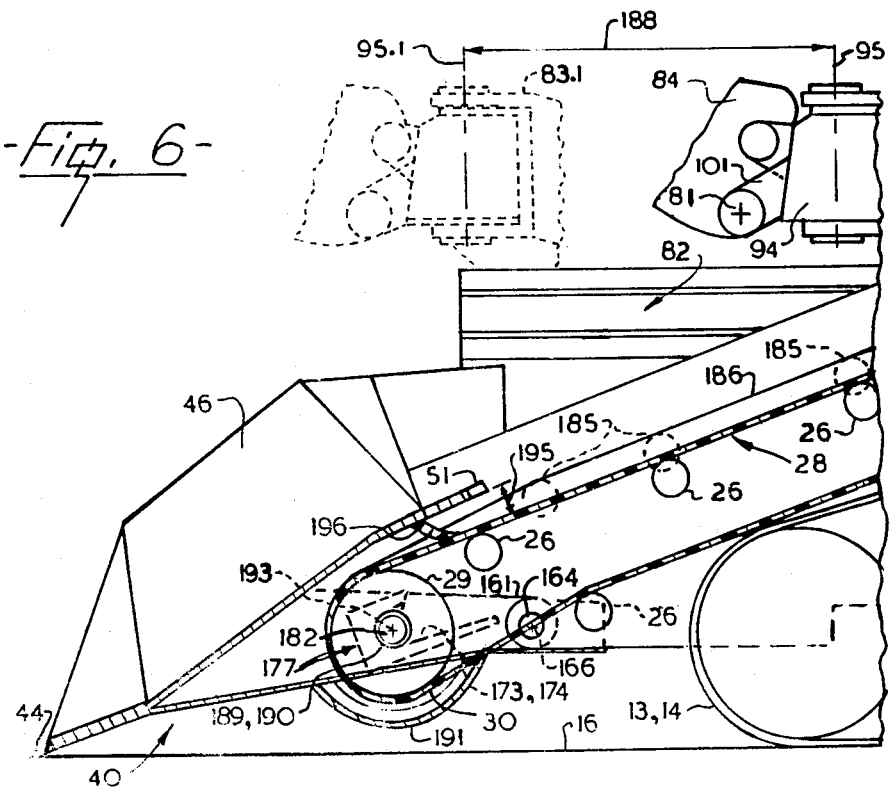
FIG. 6 is a simplified fragmented side elevation of the hopper assembly and conveyor of FIG. 5 with some portions removed.

With reference to FIG. 6, the carriage means 83 is shown fragmented in full outline at an extreme rearward position, and in broken outline at 83.1 in an extreme forward position, spaces between the two positions being defined as travel 188 of the carriage means, the rail means having lengths to accommodate the travel. The rail means 82 is clearly seen to be parallel to the ground 16 which facilitates drawing of material towards the hopper, however a non-parallel line of action may be preferred in some instances. A partially cylindrical tail drum shield 191 encloses a lower surface of the drum 29 and extends between the lower portion of the conveyor frame 25 to protect the belt 28 from damage from rocks on the ground. A flexible strip 196 extends downwardly from the hopper to sweep an upper surface of the belt beneath the hopper to serve as a stop means to prevent essentially small rocks rolling downwards between the drum 29 and the shield 191, which might then damage the belt.

Referring to FIGS. 7 and 8, the trunnion seat 173 has an open portion 197 to accept the trunnion 189 laterally, and a downwardly and forwardly inclined ramp portion 198 leading into the open portion to guide the trunnion therein as it is supported by the ramp portion and moves in direction of an arrow 199. The ramp 198 is inclined at an angle 201, which is about 20 degrees to the horizontal, which equals approximately a direction of movement of the conveyor assembly when inserted into the clearance between the crawler track frames of the vehicle body. Thus, with reference also to the previous figures, it can be seen that as the conveyor assembly is inserted into the clearance 58, whilst being supported on the support rollers 66 and 67, the lower portion 30 thereof moves in the direction of the arrow 199 and the trunnions 189 and 190 initially engage the ramps of the respective trunnion seats which guide the lower portion into the respective open portions to be retained therein. When the trunnions are located in the trunnion seats, the elevating cylinders 63 and 64 of FIG. 1 are connected to the conveyor frame 25 at an upper end thereof and the cable which was temporarily supporting the conveyor assembly can be then disconnected. Thus the conveyor assembly is supported at its lower portion of the trunnions carried in the trunnion seats to permit hinging of the conveyor assembly about the conveyor axis, and at its upper portion on the elevating cylinders as previously described. Locking means, not shown, are provided to locate the trunnions in the seats to prevent accidental rearward withdrawal thereof.

FIG. 9

As previously stated, the power means 18 of the vehicle is a hydraulic drive apparatus adapted to drive the vehicle body as required. The drive is particularly adapted to move the vehicle at a slow forward speed so that the forward lip of the hopper can be pushed into a muck heap with an automatic means to essentially eliminate skidding or scuffing of the crawler tracks if resistance becomes excessive.

A partial hydraulic schematic 202 shows some basic components that provide some of the particular advantages of the present apparatus. The power means 18 includes two separate motors, namely, a diesel engine 204 and an electric motor 205. The diesel engine is for use above ground or in environments where diesel exhaust is permissible and is used only for moving the apparatus where required. The electric motor 205 is used to power the vehicle underground and to operate all services required for the vehicle, and is supplied with electrical power from an external electrical power supply which is not shown. The diesel engine 204 drives a variable delivery hydraulic pump 207 which, through an input line 208, powers a hydraulic motor 210 which drives the crawler tracks for moving the vehicle. The electric motor 205 is coupled to a pressure-compensated, variable delivery pump 212 to feed pressurized fluid through a segregating valve 214 into the line 208 thence to the motor 210. The valve 214 is closed when the diesel motor operates and is open when the electric motor operates and thus segregates the two pressurizing systems. Thus the diesel and the electric motors both supply pressurized fluid to the hydraulic motor 210 as required and are operated independently. If required, a separate hydraulic motor for each crawler track can be used.

When mucking, the motor 205 is operating and when the forward lip of the hopper engages the muck heap, resistance to motion of the vehicle arises if the forward speed of the vehicle is appreciably less than rate of removal of material from the heap. As a result of resistance to forward movement of the vehicle, the fluid fed to the hydraulic motor is reduced and thus the motor slows or stops to reduce unnecessary scuffing of the tracks. Ideally, forward speed of the vehicle is adjusted so that the hopper is essentially constantly fed into the muck heap as the back hoe shovels the muck up the hopper and onto the conveyor, independently of separate operator control. Thus adjustment is by trial and error and once set should not require re-adjustment for a particular set of conditions.

Thus the apparatus includes a sensing means responsive to resistance of material to movement, and when the pump changes flow to the hydraulic motor it serves to control driving force of the vehicle in response to resistance of the material to movement. Thus as the vehicle drives forwardly and the back hoe continuously shovels material onto the hopper, there is an essentially continuous resistance on the forward lip of the hopper which is maintained as long as the motor 210 operates at a particular pre-set pilot pressure.

OPERATION

The operator drives the apparatus to the muck heap with the hopper 40 raised and the hoeing assembly 84 retracted. The hopper cylinders are actuated to lower the hopper until the forward lip 44 thereof is close to the ground 16 and the vehicle is driven forward until the lip engages the muck heap. The electric motor 205 drives the vehicle until the resistance of the heap causes the delivery pressure to the motor 210 to attain the predetermined pressure, at which time the pump 212 reduces fluid flow and thereby limits pressure to lessen or eliminate scuffing of the crawler tracks. The carriage means 83 is traversed towards the forward end of the rail means and the back hoe is extended to scrape muck downwards from the top of the heap to fall onto the hopper so that gravity assists in loading the hopper. As the material is drawn rearwardly along the hopper most fine material falls through the grizzly to protect the conveyor belt with a thin layer of fine material prior to receiving coarser material as the bucket sweeps the coarser material over the grizzly onto the conveyor belt. Once the material is on the hopper, the carriage can be stopped on the rail means and the back hoe can be operated to draw the material onto the belt. Or alternatively the back hoe can be operated then the carriage, or a combination of both can be used simultaneously.

Thus the muck heap is continuously reduced by hoeing and, as force on the forward lip of the hopper changes, the fluid flow from the pump is adjusted essentially continuously to match approximately vehicle forward speed with rate of removal of muck, ideally before either of the crawler tracks can slip, thus reducing track wear and load on the hydraulic drive apparatus. The operator can continue operation of the back hoe and carriage and rail means independently of movement of the apparatus into the muck heap, thus allowing him to concentrate on the job of mucking and to neglect to some extent the positioning of the apparatus. As the apparatus creeps forward through the muck heap, the ore carrier receiving muck from the upper end of the conveyor also moves as needed to follow the loading apparatus.

If the conveyor belt 28 is damaged and needs replacement, the loading apparatus is stopped and the cable, not shown, supports the upper portion of the conveyor whilst the elevating cylinders 63 and 64 are disconnected. After disconnecting the locking means to release the trunnions, the cable pulls the conveyor assembly slightly upwardly and rearwardly so as to disengage the trunnions 189 and 190 from the trunnion seats 173 and 174 respectively. The lower edges of the conveyor frame 25 are then supported on the rollers 66 and 67 as the conveyor assembly is drawn rearwardly away from the vehicle body. Another conveyor assembly can be substitued on the vehicle body by reversing the above procedure. This permits the damaged conveyor belt to be repaired properly without having the machine inoperative for a long period of time.

ALTERNATIVES AND EQUIVALENTS

FIGS. 10 through 12

A first alternative loading apparatus 220 is generally similar to the apparatus 10 of FIGS. 1 through 8 but has an alternative excavating assembly 221 substituted for the assembly 80. Thus the carriage means 83 and the rail means 82 of FIGS. 1 through 9 are eliminated and a ram 222 and a ram mounting means 223 substituted. Referring to FIG. 10, the ram 222 cooperates with the ram mounting means 223 to permit axial extension and retraction of the ram as in a telescoping mounting. Thus the ram mounting means serves as a guide means having a guide axis 227, and is disposed parallel to and displaced laterally of a feed axis 234 of a conveyor 230 when viewed from above, similarly to the guide means of FIG. 1. A traversing cylinder 231 extends between the ram and the ram mounting means to provide power for the longitdinal movement but other power means to extend and retract the ram can be substituted. The ram has an inner end 226 within the means 223 and an outer end 229 carrying a back hoe support 224, the support having a rotary actuator 232 mounted thereon having a generally vertical axis of rotation 233 disposed within a plane containing the feed axis 234 of the conveyor. The rotary actuator cooperates with an articulated arm hoeing assembly 235, only a portion of which is shown, and thus it is seen that the back hoe assembly is mounted on a journalling means disposed symmetrically relative to the conveyor. Whilst the rotary actuator is a more costly installation than the swing cylinder and bearing means of FIGS. 1 through 9, a more compact design results and this has advantages in some circumstances. Further alternative journalling means can be substituted to permit swinging of the back hoe relative to the telescoping arm.

Referring also to FIGS. 11 and 12, the ram and ram mounting means are elongated, generally square-sectioned tubes disposed symmetrically about the guide axis 227. The tubes have corners and cooperate with bracket means carrying spindles to journal rollers as will be described. Referring to FIG. 11, the inner end 226 of the ram has four inner rollers 237 carried on brackets 238 extending symmetrically from corners of the ram and journalled for rotation within planes intersecting at and parallel to the axis 227. Four right-angled, L-sectioned strips 239 are fitted adjacent the corners of and inside the ram mounting means to face inwards and to cooperate with the rollers 237 which have male V-sectioned peripheries complementary to the angle of the strips 239. Each strip has a length to accommodate travel of the carrier means, ie the ram extension, and extends forwardly from adjacent an inner end 240 of the ram mounting means to serve as a rail means for each respective roller 237. The rail means and rollers permit the inner end 226 of the ram to be restrained against rotation and simultaneously permit longitudinal movement of the ram along the axis 227.

Referring to FIGS. 10 and 12, the mounting means 223 has an outer end 241 carrying a roller box 243 disposed symmetrically about the axis 227, the box journalling four outer rollers 244 for rotation within planes disposed parallel to and intersecting at the axis 227 and spaced symmetrically about the box. The ram has four rail means 246 having lengths to accommodate the travel of the carrier means and extending from the outer end 229 towards the inner end of the ram. The rail means 246 are adjacent the corners of the ram and within planes disposed parallel to the guide axis and are disposed symmetrically around the ram and cooperate with the rollers 244 of the roller box. The outer rollers 244 have female V-sectioned peripheries and the rail means 246 are rails having square-sectioned outer corners so as to be complementary to the outer rollers.

Thus it can be seen the inner end of the ram carries a plurality of inner rollers and a plurality of rail means extend from the outer end of the ram towards the inner end. Also, the ram mounting means has a plurality of rails extending from the inner end thereof towards the outer end and cooperating with the inner rollers of the ram; and the outer end of the ram mounting means has a plurality of outer rollers cooperating with the rail means of the ram. All the rails and rollers are disposed within planes parallel to the guide axis. Thus it can be seen that the ram is restricted against rotation about the guide axis relative to the ram mounting means, and is free for longitudinal movement along the guide axis, that is along the direction of feed of the conveyor, and thus provides an extendable back hoe support and is equivalent to the carriage and rail means of FIGS. 1 through 9.

The alternative excavating assembly 221 using the ram and the ram mounting means requires sufficient structural stiffness to provide adequate support for the outer end of the ram when extended fully. In general, the telescoping boom will provide a more flexible mount for the back hoe assembly than the carriage and rail means of FIG. 1 embodiment and this may limit application of the alternative assembly 221. However, notwithstanding the possible disadvantages above relating to the telescoping boom, in theory a longer reach of the bucket should be possible for a given vehicle length and back hoe.

In some alternative arrangements, two or more telescoping rams may be fitted to cooperate with respective ram mounting means so as to increase reach of the back hoe without requiring a longer vehicle body. Alternatively, a combination of the carriage means and telescoping ram means can be used to increase reach of the back hoe in some particular applications. In FIGS. 11 and 12, the ram and ram mounting means are shown to be generally square cross-sectioned tubes with diagonally disposed rollers, however alternative, rectangular-sectioned, triangular-section or circular-sectioned tubes with alternatively disposed rollers can be substituted. Also the rail means are shown fitted at corners of the ram but this can be changed so that the rollers run on faces as opposed to corners of the ram and ram mounting means.

FIGS. 13 and 14

A second alternative loading apparatus 251 has a similar vehicle body 252, a similar replaceable conveyor assembly 253, a hopper 254 and an alternative telescoping arm assembly 255 has been substituted for the articulated arm hoeing assemblies 84 and 235 of the previous figures. The assembly 255 cooperates with a guide and carrier means including a ram 257 and a ram mounting means 258 which are generally similar to the ram and ram mounting means 222 and 223 of FIGS. 10 through 12 and are mounted on the vehicle body and not described in detail. The ram 257 has an outer end 260 mounting on a hinge a yoke 262 which is journalled for limited rotation about a vertical axis of rotation 263. A swing cylinder 265 cooperates with the yoke and the outer end 260 so that actuation of the cylinder 265 swings the yoke about the axis 263.

The telescoping arm assembly 255 has first and second arms 266 and 267 having respective inner and outer ends and cooperating with each other and an internal power means, not shown, to permit extension and retraction of the assembly 255 relative to the carrier means. The first arm 266 has a bore to accept the second arm, and respective roller support means are provided to permit relative axial movement therebetween, as in the telescoping ram and ram mounting means 222 and 223 of FIGS. 10 through 12, or equivalents thereof. The first arm is hinged to the yoke 262 for rotation about a horizontal axis of rotation 269 and a tilting cylinder 271 extends between the first arm 266 and the yoke for tilting the arm 266 about the axis 269. Thus it can be seen that the telescoping arm assembly is mounted for rotation relative to the carrier means about horizontal and vertical axes.

A bucket 273 is fitted to the outer end of the second arm 267 and can be rotated relative thereto about journalling means by power means, none of which is shown in detail.

As seen in FIG. 14, when cylinder 265 is actuated the telescoping arm assembly 255 rotates about the axis 263 and the arm swings through an arc 275. Retraction of the ram 257 only draws the bucket towards the hopper and, with suitable inclination of the arm assembly 255 relative to the hopper, so that retraction of the assembly 255 is parallel to base of the hopper, muck can be drawn up the hopper with a simple retraction motion of the arm assembly 255 only, so that the bucket assumes an upper position shown in broken outline 273.1 in FIG. 13.

The telescoping arm assembly of FIGS. 13 and 14 is equivalent to the articulated back hoe assemblies of the previous figures and has an advantage that less headroom is required for retraction of the bucket. Furthermore, as disclosed above, with suitable inclination of the telescoping arm assembly, retraction of the arm 255 only without movement of the ram and ram mounting means 257 and 258, draws the bucket in a motion parallel to the base of the hopper 254. In general this simple retraction motion requires less operator skill than articulation of the back hoe assembly.

All embodiments as discussed above relating to the extendable hoeing assembly support come within the terms of a carrier means cooperating with a guide means and carrying a hoeing assembly. The carrier means includes the carriage means 83 of FIG. 1, and the rams 222 and 257 of FIGS. 10 and 13, and the guide means includes the rail means 82 of FIG. 1, and the ram mounting means 223 and 258 of FIGS. 10 and 13. The hoeing assembly includes the articulated hoeing assemblies 84 and 235 of FIGS. 1 and 10, and the telescoping arm assembly 255 of FIG. 13.

We claim:
1. A loading apparatus including:
(a) a vehicle body having ground bearing means for supporting the body, and power and control means for positioning the vehicle body where desired,

(b) an inclined conveyor assembly extending from a lower portion adjacent a front of the vehicle to an upper portion adjacent a rear of the vehicle, the conveyor assembly having a centrally disposed longitudinal feed axis,
(c) a hopper means positioned adjacent the lower portion of the conveyor assembly and having a forward lip positioned adjacent the ground and a rear lip positioned adjacent the lower portion of the conveyor assembly so as to direct material thereonto,
(d) an excavating assembly characterized by:
  (i) a guide means mounted on the vehicle body and having a guide axis disposed generally parallel to and displaced laterally from the feed axis of the conveyor assembly when viewed from above,
  (ii) a carrier means supported by the guide means, and means to move the carrier means along the guide axis on one side of the conveyor assembly,
  (iii) a hoeing assembly having a bucket and first and second arms, the arms being connected and having respective inner and outer ends, and means to move the first and second arms relative to the carrier means, the first arm being connected to the carrier means at a location within a vertical plane containing the feed axis so as to be disposed symmetrically of the conveyor, and the outer end of the second arm being connected to the bucket to permit the bucket to sweep material onto the hopper.

2. A loading apparatus as claimed in claim 1 in which:
(a) the guide means includes a rail means extending parallel to and displaced laterally of the conveyor assembly when viewed from above,
(b) the carrier means includes a carriage means mounted on the rail means for movement along the rail means a distance defining travel of the carrier means,
(c) a hoeing assembly support extends inwardly from the carriage means, the support having a journalling means mounted thereon having a generally vertical axis of rotation disposed within a plane containing the feed axis of the conveyor, the journalling means carrying the hoeing assembly.

3. A loading apparatus as claimed in claim 2 in which:
(a) the rail means includes a central member and right hand and left hand track means disposed on each side of the central member and having lengths to accommodate the travel of the carrier means,
(b) the carriage means includes right and left hand wheel groups engaging the respective track means so as to restrain the carriage against rotational forces arising from the hoeing assembly.

4. A loading apparatus as claimed in claim 3 in which:
(a) each track means includes a track face pair having upper and lower track faces disposed generally parallel to each other when viewed laterally,
(b) each wheel group on each side of the carriage includes forward and rear wheel pairs, each wheel pair having upper and lower wheels which contact the upper and lower track faces respectively, the wheels having adjustment means to permit accurate spacing of the wheels to eliminate essentially lost motion between the track means and carriage.

5. A loading apparatus as claimed in claim 1 in which:
(a) the guide means includes a ram mounting means displaced laterally of the conveyor when viewed from above, the ram mounting means having inner and outer ends,
(b) the carrier means includes a ram cooperating with the ram mounting means to permit axial extension and retraction of the ram along the guide axis a distance defining travel of the carrier means, the ram having inner and outer ends,
(c) a hoeing assembly support cooperates with the outer end of the ram, the support having a journalling means mounted thereon having a generally vertical axis of rotation disposed within a plane containing the feed axis of the conveyor, the journalling means carrying the hoeing assembly.

6. A loading apparatus as claimed in claim 1 in which:
(a) the ground bearing means include a pair of spaced crawler tracks positioned adjacent sides of the vehicle body with clearance therebetween sufficient to accept the lower portion of the conveyor adjacent the ground.

7. A loading apparatus as claimed in claim 1 in which:
(a) the guide axis is disposed parallel to the longitudinal feed axis of the conveyor when viewed from above, and generally parallel to a plane containing lower surfaces of the ground bearing means when viewed laterally.

8. A loading apparatus as claimed in claim 1 further including:
(a) adjustable means extending between the vehicle body and the conveyor assembly to support the conveyor assembly and to vary height thereof.

9. A loading apparatus as claimed in claim 8 in which:
(a) the vehicle body has a clearance extending from the front of the vehicle body rearwardly,
(b) the lower portion of the conveyor assembly is fitted within the clearance of the vehicle body and is supported adjacent the lower portion thereof on the vehicle body, and is also supported on the adjustable means,
(c) the conveyor assembly has a width at the lower portion thereof no greater than the clearance,
so as to permit the conveyor assembly to be removed as a complete assembly from the vehicle body by releasing connections at the adjustable means and at the lower portion of the conveyor to permit the conveyor assembly to be withdrawn rearwardly from the vehicle body.

10. A loading apparatus as claimed in claim 1 in which:
(a) the hopper means includes a hopper body; a pair of support arms extending rearwardly from the hopper body and spaced apart so as to straddle the lower end of the conveyor; a hopper hinge means to hinge the support arms at a forward end of the vehicle body to permit the hopper body to swing through an arc between raised and lowered positions; hopper moving means cooperating with the hopper body to swing the hopper body relative to the vehicle body; and a first hinge portion of a conveyor hinge,
(b) the conveyor assembly includes: a conveyor frame having spaced apart side frames; head and tail drums at upper and lower ends respectively of the frame, the drums being journalled on the conveyor frame, at least one drum being powered to power a conveyor means running thereon; means cooperating with the side frames to support the conveyor means; and a second hinge portion of the conveyor hinge adjacent the lower end of the conveyor frame to cooperate with the first hinge portion of the conveyor hinge of the hopper means so that the conveyor frame is hinged relative to the hopper means and can follow, to a limited extent, movement of the hopper means.

11. A loading apparatus as claimed in claim 10 in which:

(a) the second hinge portion of the conveyor hinge includes aligned trunnions extending from the respective side frames of the conveyor,
(b) the first hinge portion of the conveyor hinge includes aligned trunnion seats complementary to the trunnions of the conveyor assembly and cooperating with the hopper means.

12. A loading apparatus as claimed in claim 11 in which:
(a) the trunnion seats cooperate with the support arms of the hopper means and have open portions to accept the trunnion means, and downwardly and forwardly inclined ramp portions leading forwardly into the open portions to guide the trunnions thereinto, and the loading apparatus further includes:
(b) conveyor steady means cooperating with the conveyor assembly and having a releasable slidable connection at an upper end thereof which permits vertical and horizontal movement of the conveyor frame and concurrently restricts lateral movement thereof.

13. A loading apparatus as claimed in claim 10 in which:
(a) the first and second conveyor hinge portions cooperating with the hopper and the conveyor assembly respectively form the conveyor hinge having a conveyor hinge axis disposed generally normally to the feed axis of the conveyor, which permits the conveyor assembly to rotate relative to the hopper,
(b) the tail drum of the conveyor assembly rotates about an axis coincident with the conveyor hinge axis.

14. A loading apparatus as claimed in claim 1 in which:
(a) the control means includes an operator control unit positioned adjacent the front of the vehicle body and on a side of the conveyor assembly opposite to the guide means of the excavating assembly,
so as to provide good visibility for an operator whilst operating the apparatus.

15. A loading apparatus as claimed in claim 2 in which the journalling means includes:
(a) a bearing means mounted adjacent an outer portion of the hoeing assembly support,
(b) a rotatable means journalled in the bearing means for rotation about the axis of rotation, the rotatable means having first and second mounts extending therefrom, the first mount carrying the hoeing assembly,
(c) a hydraulic cylinder extends between a connector cooperating with a portion of the carrier means and the second mount of the rotatable means,
so that actuation of the cylinder rotates the rotatable means to swing the hoeing assembly as desired.

16. A loading apparatus as claimed in claim 2 in which:
(a) the journalling means includes a rotary actuator, mounted adjacent an outer end of the hoeing assembly support and cooperating with the hoeing assembly,
so that actuation of the actuator swings the hoeing assembly as desired.

17. A loading assembly as claimed in claim 1 in which the hoeing assembly has articulated arms characterized by:
(a) the outer end of the first arm being journalled for rotation relative to the carrier means about horizontal and vertical axes of rotation,
(b) the inner ends of the first and second arms being hinged at a main connector to permit relative swinging therebetween.

18. A loading apparatus as claimed in claim 5 in which:
(a) the ram has a plurality of rail means having lengths to accommodate the travel of the carrier means and extending from the outer end of the ram towards the inner end of the ram and disposed within planes parallel to the guide axis, and the inner end of the ram has a plurality of inner rollers mounted for rotation within planes parallel to the guide axis,
(b) the ram mounting means has a plurality of rail means having lengths to accommodate the travel of the carrier means and extending forwardly from the inner end of the ram mounting means and disposed within planes parallel to the guide axis and cooperating with the inner rollers of the ram, and the outer end of the ram mounting means has a plurality of outer rollers disposed within planes parallel to the guide axis and cooperating with the rail means of the ram,
so that the ram is mounted for longitudinal movement relative to the ram mounting means along the guide axis so as to traverse longitudinally the back hoe support, and is restricted against rotation about the guide axis.

19. A loading apparatus as claimed in claim 18 in which:
(a) the outer rollers mounted on the ram mounting means have female V-sectioned peripheries and the rail means of the ram are rails having square-sectioned outer corners so as to be complementary to the outer rollers,
(b) the inner rollers mounted on the ram have male V-sectioned peripheries and the rail means of the ram mounting means are L-sectioned rails so as to be complementary to the inner rollers.

20. A loading apparatus as claimed in claim 19 in which:
(a) the ram and ram mounting means are generally complementary, rectangular cross-sectioned tubes disposed symmetrically about the guide axis, and having corners,
(b) bracket means to journal the respective rollers extend symmetrically at the corners of the ram and ram mounting means,
(c) the rail means are fitted adjacent the corners of the ram and ram mounting means to engage the respective rollers.

21. A loading assembly as claimed in claim 1 in which the hoeing assembly has telescoping arms characterized by:
(a) the first arm being journalled for rotation relative to the carrier means about horizontal and vertical axes of rotation and having a bore to accept the second arm, the arms having support means to permit relative axial movement therebetween.

22. A loading apparatus as claimed in claim 1 further including:
(a) a grizzly extending between the sidewalls of the hopper means and rearwardly from the rear lip thereof, the grizzly having a plurality of laterally spaced fingers extending rearwardly therefrom, the fingers having outer ends disposed within an arc having a centre disposed rearwardly of the grizzly and copolanar with the feed axis of the conveyor, spaces between the fingers adjacent the centre of the grizzly extending more forwardly than spaces between outer fingers, so that initially fine material collects in a trough of a conveyor means of the conveyor assembly, then on inclined sides thereof prior to heavier material falling onto the conveyor means.

23. A loading apparatus as claimed in claim 1 in which:
(a) the conveyor assembly has a conveyor means and the apparatus further includes:
(b) a tail drum shield enclosing a lower surface of the tail drum and extending between lower portions of the conveyor frame to protect the conveyor means from damage,
(c) a flexible strip extending downwardly from the hopper to sweep an upper surface of the conveyor means to serve as a stop means to prevent essentially rocks rolling downwards between the drum and the shield.

24. A loading apparatus as claimed in claim 8 further including:
(a) a pair of axially aligned, spaced support rollers carried on the vehicle body beneath the conveyor assembly,
(b) a pair of spaced wheels straddling the upper portion of the conveyor,
the rollers and wheels supporting and protecting the conveyor assembly when the adjustable means is lowered, the adjustable means being characterized by:
(c) a pair of parallel elevating cylinders extending between the vehicle body and the conveyor assembly adjacent the upper portion thereof.

25. A loading apparatus including a ground supported vehicle body adapted for positioning where desired, an inclined conveyor assembly extending upwardly and rearwardly along a centrally disposed longitudinal feed axis thereof from a front of the vehicle, and a hopper means adjacent the front of the vehicle adapted to direct material onto the conveyor, the apparatus being further characterized by an excavating assembly including:
(a) a guide means mounted on the vehicle body and having a guide axis disposed generally parallel to and displaced laterally from the feed axis of the conveyor assembly when viewed from above,
(b) a carrier means supported by the guide means, and means to move the carrier means along the guide axis on one side of the conveyor assembly,
(c) a hoeing assembly having a bucket and first and second arms, the arms being connected and having respective inner and outer ends, and means to move the first and second arms relative to the carrier means, the first arm being connected to the carrier means at a location within a vertical plane containing the feed axis so as to be disposed symmetrically of the conveyor, and the outer end of the second arm being connected to the bucket to permit the bucket to sweep material onto the hopper.

26. A loading apparatus as claimed in claim 25 in which:
(a) the guide means includes a rail means extending parallel to and displaced laterally of the conveyor assembly when viewed from above,
(b) the carrier means includes a carriage means mounted on the rail means for movement along the rail means a distance defining travel of the carrier means,
(c) a hoeing assembly support extends inwardly from the carriage means, the support having a journalling means mounted thereon having a generally vertical axis of rotation disposed within a plane containing the feed axis of the conveyor, the journalling means carrying the hoeing assembly.

27. A loading apparatus as claimed in claim 25 in which:
(a) the guide means includes a ram mounting means displaced laterally of the conveyor when viewed from above, the ram mounting means having inner and outer ends,
(b) the carrier means includes a ram cooperating with the ram mounting means to permit axial extension and retraction of the ram along the guide axis a distance defining travel of the carrier means, the ram having inner and outer ends,
(c) a hoeing assembly support cooperates with the outer end of the ram, the support having a journalling means mounted thereon having a generally vertical axis of rotation disposed within a plane containing the feed axis of the conveyor, the journalling means carrying the hoeing assembly.

28. A loading apparatus as claimed in claim 25 in which:
(a) the guide axis is disposed parallel to the longitudinal feed axis of the conveyor when viewed from above, and generally parallel to a plane containing lower surfaces of the ground bearing means when viewed laterally.

29. A loading apparatus as claimed in claim 25 further including
(a) adjustable means extending between the vehicle body and the conveyor assembly to support the conveyor assembly and to vary height thereof,
and in which:
(b) the vehicle body has a clearance extending from the front of the vehicle body rearwardly,
(c) a lower portion of the conveyor assembly is fitted within the clearance of the vehicle body and is supported adjacent the lower portion thereof on the vehicle body, and is also supported on the adjustable means,
(d) the conveyor assembly has a width at the lower portion thereof no greater than the clearance.

30. A loading apparatus as claimed in claim 25, in which the hoeing assembly has articulated arms characterized by:
(a) the outer end of the first arm being journalled for rotation relative to the carrier means about horizontal and vertical axes of rotation,
(b) the inner ends of the first and second arms being hinged at a main connector to permit relative swinging therebetween.

31. A loading apparatus as claimed in claim 25 in which the hoeing assembly has telescoping arms characterized by:
(a) the first arm being journalled for rotation relative to the carrier means about horizontal and vertical axes of rotation and having a bore to accept the second arm, the arms having support means to permit relative axial movement therebetween.

32. A loading apparatus as claimed in claim 29 further including:
(a) a pair of axially aligned, spaced support rollers carried on the vehicle body beneath the conveyor assembly,
(b) a pair of spaced wheels straddling the upper portion of the conveyor,
the rollers and wheels supporting and protecting the conveyor assembly when the adjustable means is lowered, the adjustable means being characterized by:
(c) a pair of parallel elevating cylinders extending between the vehicle body and the conveyor assembly adjacent the upper porton thereof.

* * * * *